Feb. 10, 1953 — F. H. BOGART — 2,627,648
MOTOR-DRIVEN STOCK FEED
Filed July 30, 1948 — 2 SHEETS—SHEET 1
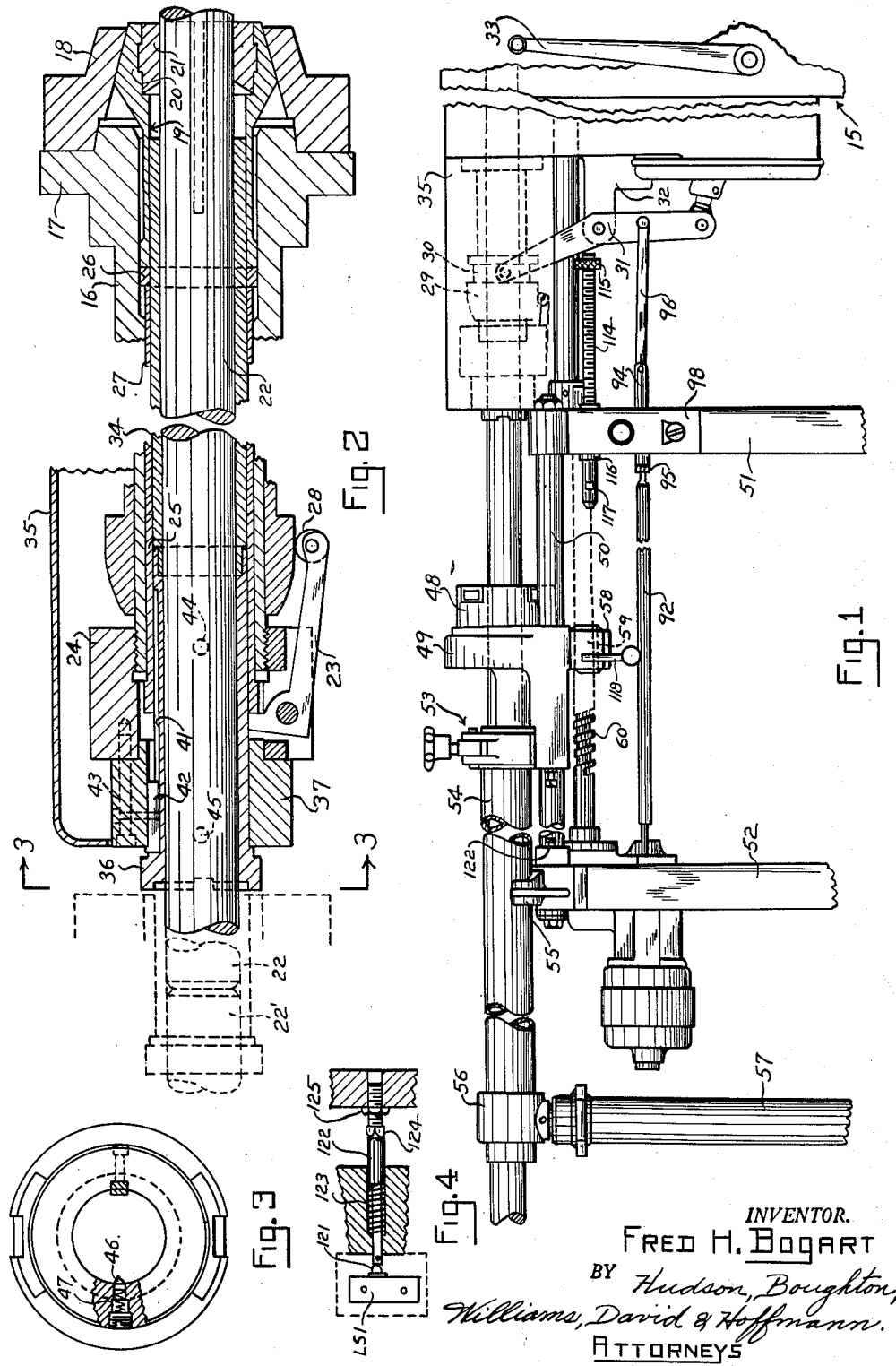
INVENTOR.
FRED H. BOGART
BY Hudson, Boughton,
Williams, David & Hoffmann.
ATTORNEYS Feb. 10, 1953  F. H. BOGART  2,627,648
MOTOR-DRIVEN STOCK FEED
Filed July 30, 1948  2 SHEETS—SHEET 2
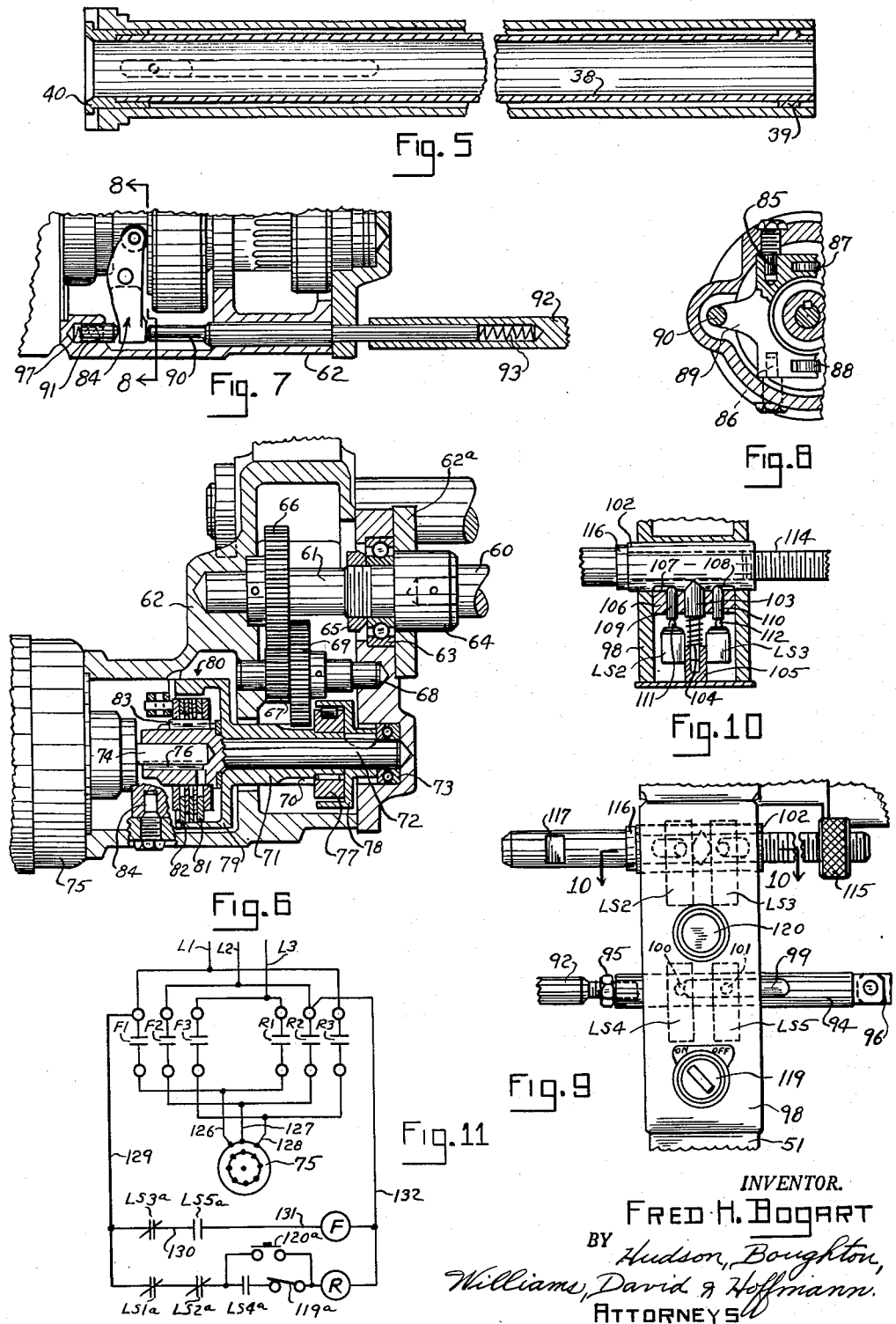
INVENTOR.
FRED H. BOGART
BY Hudson, Boughton,
Williams, David & Hoffmann.
ATTORNEYS Patented Feb. 10, 1953

2,627,648

UNITED STATES PATENT OFFICE 2,627,648

MOTOR-DRIVEN STOCK FEED

Fred H. Bogart, South Euclid, Ohio, assignor to
The Warner & Swasey Company, Cleveland,
Ohio, a corporation of Ohio Application July 30, 1948, Serial No. 41,639

20 Claims. (Cl. 29—59)

This invention relates to a machine tool and, more particularly, to an improved stock feeding mechanism for a machine tool which is adapted to machine bars, tubes, or the like.

An object of the invention is to provide an improved power operated mechanism for feeding elongated stock such as bars, tubes, or the like, the operation of which mechanism is electrically controlled to effect feeding of the stock a predetermined distance and return of the mechanism to its initial position in preparation for a new feeding actuation, the mechanism being automatically stopped at the preselected limits of these movements.

Another object of the invention is to provide an improved electrically controlled feeding mechanism for bar stock or the like of the type mentioned in the preceding object and in which the controls include means to effect return of the stock feeding mechanism to its extreme retracted position, in preparation for a new series of feeding operations, and means to automatically stop the mechanism when it reaches its extreme retracted position.

A further object of the invention is the provision of an improved power operated stock feeding mechanism for a machine tool having a work gripping chuck, in which the operation of the stock feeding mechanism is electrically controlled by the same control lever employed to effect operation of the work gripping chuck, whereby operation of a single control lever is effective to both feed the stock a predetermined distance and to effect sequential gripping and release of the latter.

A still further object of the invention is the provision of a novel stock feeding mechanism of the type mentioned in the preceding object and in which the speed of feeding is controllable by the amount of pressure exerted by the operator upon the control lever so that stock may be rapidly advanced or "inched along" as is desired.

The invention further resides in certain novel features of construction and combinations and arrangements of parts, and further objects and advantages thereof will be apparent to those skilled in the art to which it pertains from the following description of the present preferred embodiment, described with reference to the accompanying drawings in which similar reference characters represent corresponding parts in the several views and in which:

Fig. 1 is a fragmentary, side elevational view showing the novel stock feeding mechanism and cooperating liner tube applied to a machine tool, only a portion of the headstock of the latter being illustrated;

Fig. 2 is an enlarged, fragmentary, longitudinal sectional view through the spindle of the machine tool showing the novel liner tube disposed therein, the tube being shown in full lines at its inner position and in broken lines at its extended or outer position to illustrate the manner in which the tube supports two succeeding lengths of stock in alignment, the key for the liner tube being shown displaced approximately 90 degrees from its true position to facilitate the illustration thereof;

Fig. 3 is a detached view, partly in section and partly in elevation, the view being taken substantially on the section indicating line 3—3 of Fig. 2 with the stock and the liner tube removed and showing the means for yieldably retaining the liner tube in either of its two extreme positions;

Fig. 4 is a fragmentary view, partly in section and partly in side elevation, illustrating the limit switch and the operating mechanism therefor which is actuated by the stock feeding head to limit the rearward movement of the latter;

Fig. 5 is a longitudinal sectional view through the improved liner tube which is here shown as provided with a second liner or filler tube to accommodate stock of smaller diameter than the internal diameter of the principal liner tube, portions of the tubes being broken away intermediate their ends;

Fig. 6 is a view substantially in vertical section through the driving mechanism of the novel stock feeding apparatus;

Fig. 7 is a fragmentary view of the lower portion of the driving mechanism illustrated in Fig. 6, the upper portion of the housing and the gearing contained therein being removed to illustrate the clutch and its operating lever in top plan;

Fig. 8 is a fragmentary sectional view taken substantially on the section indicating line 8—8 of Fig. 7;

Fig. 9 is a fragmentary side elevational view of the forward supporting stand for the stock feeding mechanism illustrating certain of the controls mounted therein;

Fig. 10 is a fragmentary sectional view taken substantially on the section indicating line 10—10 of Fig. 9; and, Fig. 11 is a simplified, schematic, electrical wiring diagram for the stock feeding mechanism of this invention.

This invention is adapted for use upon a conventional machine tool of the type adapted to operate upon elongated stock such as bars, tubes, or the like. The construction of such a machine tool is well known and hence only so much thereof will be described and illustrated as is necessary to an understanding of the present invention. Such a machine tool comprises a headstock, generally designated 15, provided with a hollow spindle 16 which is rotatably supported in the headstock and driven by conventional driving means not shown. The forward portion of the spindle 16 is provided with an integral flange 17 to which is attached the nose member 18 of a suitable work-holding chuck, here illustrated as being of the push-out collet type although it will be understood that other types of chucks may be employed. As is well known in the art, the nose 18 has a frusto-conically shaped opening therein within which is positioned the collet 19 which has the usual resilient jaws 20, the outer surfaces of the latter being frusto-conically shaped for cooperation with the nosepiece 18. Preferably, the jaws 20 are provided with interchangeable jaws or pads 21 which grip the work or stock 22 disposed therein when the collet 19 is moved forwardly, or to the right as viewed in Fig. 2, relative to the nose 18.

The collet 19 is adapted to be operated by a plurality of pivoted fingers 23 which are substantially bell crank in nature and are pivotally supported in a finger housing 24 adjustably connected with the spindle 16, as is well known in the art. The shorter or inner ends of the fingers 23 bear against the end of a sleeve 25 slidably positioned within the spindle 16. If desired, the sleeve 25 may be of sufficient length to extend into contact with the inner end of the collet 19, but preferably, as shown, a ring 26 and a sleeve 27 are interposed between the collet and the inner end of the sleeve 25. The outer or longer arms of the fingers 23 are provided with rollers 28 adapted to be engaged and actuated by a finger cone or wedge 29 which is slidably mounted upon the outer surface of the spindle 16 and is adapted to be longitudinally moved to effect rocking of the fingers 23. The finger actuating cone or wedge 29 is provided with an annular groove or recess 30 in which is received rollers or shoes on the ends of the spaced arms of a bifurcated lever 31, the latter being pivotally mounted on a bracket 32 attached to the headstock 15.

It will be readily understood that, when the lever 31 is rocked in a counter-clockwise direction to the position substantially shown in Fig. 1, the cone or wedge 29 will be moved to the left as shown in that figure, thereby rocking the longer arms of the fingers or levers 23 radially outwardly, as viewed in Fig. 2. Consequently, the shorter or inner arms of these fingers will exert a force upon the outer end of the tube 25 which is transmitted through the tube or sleeve 27 and ring 26 to the collet 19, forcing the latter outwardly, or to the right as shown in the drawings so that its jaws are cammed into firm gripping engagement with the stock 22 positioned therein. When the lever 31 is rocked in the opposite direction, the cone 29 is withdrawn from its cooperating engagement with the rollers 28 of the collet-actuating fingers, whereupon the resiliency of the jaws 20 of the collet shifts it and its actuating sleeve or sleeves to the left as shown in Fig. 2, thereby releasing the stock 22. The lever 31 may be operated by any suitable mechanism actuated by means of a control lever 33 pivoted to the headstock of the machine tool, the control lever being either connected with the lever 31 by suitable linkages for direct manual operation or, if desired, the lever 33 may control a power booster or other power mechanism for operating the lever 31 as is well known in the art.

The diameter of the stock 22 being operated upon by the machine tool will be selected in accordance with the nature of the workpieces produced and hence will vary from diameters closely approximating the internal diameter of the spindle 16 down to diameters very considerably less. When the diameter of the stock 22 does not closely approximate the internal diameter of the spindle 16, the rotation of the stock during a machining operation causes whipping of the stock within the spindle bore, thereby producing objectionable noise and adversely affecting the accuracy of the work produced as well as imposing unnecessary stresses and strains upon the machine tool. Consequently, the bore of the spindle 16 is provided with a liner or filler tube or tubes, the internal diameter of which closely approximates the outside diameter of the stock being machined. Such a filler or liner tube 34 is shown in Fig. 2 as being slidably positioned within the collet actuating sleeve or sleeves, such as 25, 27 with the inner end of this liner tube extending into the rear portion of the jaws of the collet. The internal diameter of the tube 34 is substantially equal to the external diameter of the stock so that the latter is supported throughout its length within the bore of the spindle with the exception of a relatively small gap between the end of the liner tube and the pads or jaw members 21. The outer end of the liner tube 34 extends beyond the outer end of the bore of the spindle and the end of the extension housing 35 provided therefor, this end of the liner tube or tubes having a flange portion 36 integral therewith or attached thereto. The flange portion 36 abuts the outer surface of a collar 37 which is connected with the finger housing 24, and hence with the spindle 16, so that the liner tube is prevented from entirely entering the bore of the spindle. The flange portion 36 also provides a convenient hand grip for withdrawing or partially withdrawing the tube as hereinafter explained. The concept of providing a liner tube or tubes in the hollow spindle of a machine tool does not, per se, constitute a part of this invention but is disclosed and claimed in the copending application of Walter Belshaw, Serial No. 15,142, filed March 16, 1948, and assigned to the assignee of this invention.

The liner tube 34 illustrated in Fig. 2 has a substantially solid sidewall which is equal in thickness to the difference between the radii of the stock and the collet actuating sleeve. Where the difference between these radii is great, however, the liner tube may be relatively thin walled and provided with a plurality of spaced external bearing rings, thereby reducing the weight thereof, while providing a smooth interior for the stock. Instead of the last-mentioned construction, the liner tube 34 may itself be provided with an additional liner tube or tubes, such as 38, see Fig. 5, which are constructed of relatively thinwalled tubing provided with one or more spaced external band or ring portions 39 to provide bearings for the tube 38. The outer end of this supplementary liner tube 38 is preferably provided with a flanged portion 40 which both provides a means to limit longitudinal movement inwardly of tube 34 and also affords a convenient hand grip for withdrawing the tube 38 when larger stock is to be accommodated.

As shown in Fig. 2 of the drawings, the liner or filler tube 34 is provided with a keyway 41, extending longitudinally along a portion of its outer surface, in which is slidably received a key 42, the latter being retained in the collar or ring 37 by any suitable means, such as for example, by means of a machine screw 43. Consequently, the liner tube 34 is connected to rotate with the spindle, and hence with the stock 22, thereby reducing wear which might occur if the liner tube were not connected for rotation with the spindle and stock. The key and keyway, however, enable the liner tube to be longitudinally moved relative to the spindle so that the liner tube may be telescoped within the spindle as shown in full lines in Fig. 2, or may be partially withdrawn therefrom as indicated in broken lines in the same figure. In order to determine these two extreme positions of the liner tube and maintain the tube in either of the positions to which it is set, the said tube is provided with two spaced recesses 44 and 45 which are adapted to be selectively aligned with a spring-pressed plunger 46 mounted in the collar 37.

The construction just described is such that, when the liner tube 34 is positioned at its innermost location as shown in full lines in Fig. 2, the pin or plunger 46 enters the recess 45 yieldably retaining the liner in this position against accidental displacement. When, however, it is desired to employ the liner tube 34 in its extended position, the flange 36 thereof is grasped and a pull is exerted upon the tube. Since the inner end of the pin or plunger 46 is tapered, this pull causes the latter to be cammed outwardly so that the tube may be moved to bring the recess 44 into alignment with the plunger 46 whereupon the latter is forced into the former by action of the cooperating spring 47, thus yieldably retaining the tube in its extended position.

The tube 34 may be partially withdrawn to its extended position, as just described, to provide a support for stock exteriorly of the machine tool spindle, as, for example, when the stock is of relatively small diameter and the distance to the adjacent standard of the stock feeding mechanism is such that the stock might whip therebetween due to flexing of the stock. This extensible feature of the liner tube has a further important function in that it enables the securing of proper alignment between the forward end of a new length of stock 22' and the rear end of the length of stock 22 which is positioned within the spindle 16, this being indicated in the broken line portion of Fig. 2. Consequently, when the length of stock 22 within the spindle 16 has become too short to be fed by direct engagement with the bar feeding mechanism, hereinafter described, feeding may still be accomplished by providing a new length of stock 22' in the feeding mechanism, partially withdrawing the liner tube 34 from the spindle and telescoping the tube over the adjacent ends of the two lengths of stock so that they are held in alignment. The new length of stock 22' then acts as a pusher bar to feed the remaining length of the stock 22 through the spindle 16. As the stock feeding mechanism, hereinafter described, advances the new length of stock 22, the feeding head of the mechanism, during its feeding movement, eventually engages the flange portion 36 of the liner tube returning the latter to its inner position as shown in full lines in Fig. 2, the plunger or pin 46 yielding, as stated before, to allow this movement and then reentering the recess 45 when the liner tube has reached its inner position. Consequently, the adjacent ends of the lengths of stock 22 and 22' are guided throughout substantially the entire length of the spindle, since in its inner position the liner tube 34 is closely adjacent the jaws of the chuck.

The stock feeding mechanism comprises a conventional feed chuck or head 48 provided with spring-pressed jaws which grip the bar stock 22 with sufficient pressure to feed the latter when the jaws of the collet 19 are in work releasing position, the pressure of the jaws of the feed chuck or head being such that the latter is capable of sliding relative to the stock when the collet chunk 19 is gripping the stock. The head or chuck 48 is rotatably supported in a housing 49 and the latter has a downwardly extending portion slidably mounted upon parallel guide rods 50 which are mounted in horizontally spaced relationship upon spaced vertical standards 51 and 52. A rearward extending portion of the housing 49 is provided with the usual clamp member, generally designated 53, for clamping thereto a guide tube 54 for movement therewith. This tube 54 serves to support the stock and is in turn supported by a suitable bracket 55 on the upper end of the standard 52 and by a tubular support 56 on the upper end of a standard 57, the support 56 being pivoted on said standard to swing horizontally over the bracket 55 for the purpose of loading. The portions of the stock feeding mechanism just mentioned are conventional and hence need not be described in further detail.

In accordance with this invention, the lower portion of the housing 49 for the stock feeding head or chuck has a portion 58 depending below the guide bars 50. This portion 58 has a longitudinal bore therethrough in which a nut 59 is stationarily mounted. Threaded through the nut 59 is a longitudinally extending screw 60 which is rotatably supported in the adjacent standards 51, 52 and held from longitudinal displacement with respect thereto. This screw 60 is adapted to be motor driven and when rotated causes movement of the stock feeding head or chuck 48 to effect feeding of the stock or return of the head after such feeding operations.

As shown in Fig. 6 of the drawings, the rear end of the screw 60 is connected with a stud shaft 61 which is journalled within a housing 62 attached to the standard 52, an anti-friction bearing 63 being provided for the shaft 61 adjacent the rear of the connecting member 64 which unites the shaft with the screw 60. The inner race of the bearing 63 is retained against the rear of the connecting member 64 by means of a nut 65 screwed upon a threaded portion of the shaft 61 and the outer race of the bearing is retained in a counterbore in the side wall of the housing by a cover plate 62a.

Within the housing 62, and connected with the shaft 61 to rotate therewith, is a spur gear 66 which meshes with the smaller gear 67 of a pair of compound gears pinned or otherwise connected to a shaft 68 journalled in the housing 62, the larger gear 69 of the compound gears meshing with gear teeth 70 provided upon a portion of a sleeve member 71. The sleeve member 71 is rotatably supported upon a shaft 72 which has one end journalled in an anti-friction, thrust-type bearing 73 mounted in a portion of a housing 62. The other end of the shaft 72 is enlarged and is provided with a centrally disposed bore in which is received the armature shaft 74 of a reversible three-phase, alternating current, electric motor 75, the shafts 74 and 72 being connected for rotation by a key 76.

Keyed to a reduced diameter cylindrical portion of the sleeve 71 is one member 77 of a ball- or roller-type one-direction clutch, the other member 78 of which is keyed to an adjacent portion of the shaft 72. The end of the sleeve 71, opposite to that provided with the one-direction clutch, has an enlarged annular portion 79 forming one member of a variable torque transmission device, for example a friction clutch, generally designated 80. This friction clutch may be of any suitable type, but is here shown as comprising a plurality of disk-like friction members, one set 81 of these friction members being keyed to the annular portion 79 of the sleeve 71 and the other set of friction members or disks 82 being connected by a key 83 to the enlarged portion of the shaft 72. The right-hand disk or member 82, as viewed in Fig. 6, abuts against an integral shoulder on the shaft 72, while the left-hand disk or member 82 is engaged by a portion of a clutch actuating lever, generally designated 84, which is movable to exert pressure upon, and hence effect engagement between, the friction members of the clutch.

As illustrated in Figs. 7 and 8, the lever 84 is pivoted within the housing 62 by vertically extending pivot pins 85 and 86. At one side of the pivots, the lever 84 is bifurcated to straddle the enlarged portion of the shaft 72 and the spaced arms of this portion of the lever are provided with rollers 87 and 88 engaging the adjacent friction member or disk 82 to move the latter when the lever is rocked. At the other side of the pivots 85, 86, the lever 84 has a single arm 89, one face of which is engaged by the end of an operating rod 90 which is slidably mounted within a portion of the housing 62, see Fig. 7. The other side of this arm 89 bears against a spring-pressed plunger 91 slidably positioned in a bore in the adjacent wall of the housing 62.

The other end of the actuating rod 90 is received within the bore of the adjacent end of a connecting rod or link 92, a compression spring 93 being preferably provided between the bottom of the bore in this link and the corresponding end of the rod 90. The rod or link 92 is adjustably connected to a link 94 as, for example, by having an externally threaded portion of the former received within an internally threaded portion of the latter, a jam or lock nut 95 being provided to retain the parts in adjusted position. The end of the link 94, opposite its connection with the rod or link 92 is pivotally connected with a link 96 which is, in turn, pivotally connected to the actuating lever 31 for the finger actuating cone or wedge of the work-gripping chuck.

The construction just described is such that, when the control lever 33 is operated to rock the lever 31 in a clockwise direction, the collet chuck is actuated in a direction to effect opening or releasing of the chuck and a thrust is exerted through the links 96, 94, and rod or link 92. This thrust is transmitted through the compression spring 93 and rod 90 to the arm 89 of the lever 84. The latter is therefore rocked clockwise, as viewed in Fig. 7, moving the rollers 87, 88 to the right, as viewed in Figs. 6 and 7, thereby exerting a clutch-engaging pressure between the friction members 81, 82 of the clutch 80. Consequently, the motor 75 drives through its shaft 74 and the clutch 80 to rotate the sleeve 71 and the latter, through its teeth 70 and the gears 69, 67, and 66, rotates the shaft 61 and the screw 60, it being understood that the one-direction ball or roller clutch 77, 78 freely slips during this direction of rotation of the parts. This rotation of the screw 60 is in the direction which moves the bar feeding head or chuck 48 in a feeding direction, that is, to the right as viewed in Fig. 1, and the movement in this direction is electrically controlled as hereinafter described.

When the chuck actuating lever 33 is operated in the reverse direction to effect work gripping action by the collet chuck 19, a pull is exerted upon the links 96, 94 and the rod or link 92 so that the compression of the spring 93 is relieved. Hence the spring 97 causes the plunger 91 to rock the clutch lever 84 in the counterclockwise direction to effect disengagement of the clutch 80 thus terminating the rotation of the screw 60 in the feeding direction just mentioned. As will be hereinafter described, actuation of the control lever 33 in the last-mentioned direction operates electrical controls for reversing the direction of rotation of motor 75 so that the latter now drives through its shaft 74 and the connected shaft 72, causing the sleeve 71 to now rotate in the reverse direction by virtue of the positive clutching action provided by the one-direction clutch 77, 78. Consequently, the previously described gears 69, 67, and 66 are rotated in the reverse direction so that the screw 60 likewise is rotated in reverse direction, thus causing the feeding head or chuck 48 to return to the left, as viewed in Fig. 1, motion in this reverse direction being terminated as hereinafter described.

As will be seen in Figs. 1 and 9, the link 94 is slidably mounted in a suitable opening within a housing 98 supported upon the side of the standard 51 adjacent the top thereof. Intermediate its ends, the link 94 is provided with a longitudinally extending cam groove or recess 99 having tapered ends adapted to operate a pair of limit switches LS4 and LS5, which are preferably of the type requiring a relatively small distance of movement to effect operation of their contacts LS4a and LS5a which are normally open. Switches of this type are well known in the trade and may be purchased under the name of Micro Switches.

The switches LS4 and LS5 are mounted in parallel, spaced relationship upon the inner surface of the forward wall of the housing 98 and have their actuating pins or operating rods 100 and 101 disposed in horizontal alignment with each other and with the cam groove or recess 99. The length of the cam groove 99 is such that in one extreme position the one end thereof is moved beyond the actuating pin 100 so that the latter is cammed out of the groove and onto the adjacent outer surface of the link 94, thereby operating the contacts of the switch LS4 to closed position. At the same time, the pin 101 will be positioned within the cam groove 99 as shown in Fig. 9, so that the contacts LS5a of switch LS5 remain open. When the link 94 is moved to its other extreme position, the pin 100 enters the cam groove 99, thus opening the contacts LS4a of switch LS4, while the pin 101 now rides out of the groove 99 and onto the adjacent outer surface of the link 94 thereby closing the contacts LS5a of the switch LS5. These switches LS4 and LS5, respectively, control reverse and forward rotation of the motor 75, as will be presently described.

Above the link 94, the housing 98 is provided with a suitable opening in which is slidably mounted a sleeve 102. This sleeve has a substantially V-shaped tapered notch in one side thereof in which is received the inner tapered end of a pin or plunger 103. The latter is continuously urged to this position by a compression spring 104 which extends about a reduced diameter shank of the pin 103, the ends of the spring abutting the enlarged portion of the pin or plunger 103 and a boss 105 in which the end of the reduced portion of the pin or plunger is slidably received, the enlarged portion of the plunger being guided by being slidably positioned in an opening of a transverse member 106 of the housing 98. Adjacent either side of the substantially V-shaped notch in the sleeve 102, the latter is provided with longitudinally extending cam grooves or recesses 107, 108 having inclined outer ends, as shown in Fig. 10, for actuating pins 109 and 110 which are, respectively, slidably supported in openings in the transverse member 106. The other ends of these pins 109, 110 are in engagement with the operating buttons 111 and 112 respectively of limit switches LS2 and LS3.

The switches LS2 and LS3 are similar to the previously mentioned switches LS4 and LS5 except that the switches LS2 and LS3 have their contacts LS2a and LS3a normally closed when the sleeve 102 is positioned as shown in Fig. 10. Longitudinal movement of the sleeve 102 sufficiently to move the groove 107 from beneath the pin 109 or the groove 108 from beneath the pin 110 causes the end of the groove to move the corresponding pin sufficiently to open the contacts of the corresponding switch LS2 or switch LS3. It will be observed, however, that the pins 109, 110 are so disposed relative to the grooves 107, 108 that one pin remains within its groove when the othher groove has moved sufficiently to actuate the corresponding pin so that the switches LS2 and LS3 operate alternately upon alternate movements of the sleeve 102. It should be further noted that the longitudinal movement of the sleeve 102 to actuate the switches LS2 and LS3 is relatively small and is generally effected without entirely disengaging the tapered end of the pin 103 from the corresponding notch in the sleeve so that the plunger is effective to again centralize the sleeve within the housing 98 when the force tending to move the sleeve is removed. Furthermore, the plunger 103 prevents accidental displacements of the sleeve 102, as for example, due to vibrations or sliding movement of the rod 114 therethrough.

As just mentioned, a rod 114 is slidably mounted within the bore of the sleeve 102 and has portions normally projecting on either side of the sleeve. The right-hand end of this rod, as viewed in Figs. 1 and 9, is threaded and is provided with a nut 115 which may be adjustably positioned along the screw to provide for feeding of different lengths of stock as hereinafter mentioned. The portion of the rod 114 on the other side of the sleeve 102 is provided with a collar 116 which may be a separate member fixed thereto or an integral flange formed thereon. The outer end of this portion of the rod 114 is tapered and intermediate the tapered portion and the collar 116 there is provided a notch or recess 117. The tapered portion of the rod 114 is aligned with, and adapted to enter into, an opening provided in the downwardly extending portion 58 of the housing 49 for the feeding head or chuck 48. When the slide rod 114 has thus entered the portion 58, it may be connected thereto by a pivoted latch 118 carried by the portion 59 and having a part adapted to enter into the notch 117. Consequently, the slide rod 114 may be connected with the stock feeding head or chuck 48 and moved therewith.

When the rod 114 is connected with the stock feeding head or chuck and the latter has been moved forwardly sufficiently to feed the desired length of stock through the spindle and collet chuck 19, the collar 116 engages the adjacent end of the sleeve 102, moving the latter slightly to the right from the position shown in Fig. 10. This moves the groove or recess 108 from beneath the pin 110 so that the latter is moved outwardly and rides upon the outer surface of the sleeve 102, thereby depressing the button 112 of switch LS3. This opens the contacts LS3a of the switch, terminating the rotation of the motor in the direction which causes forward movement of the stock feeding mechanism. When the motor is now energized for rotation in the reverse direction, the stock feeding head or chuck is moved rearwardly by virtue of the rotation of screw 60 carrying therewith the rod 114 which freely slides within the sleeve 102. When the work feeding head or chuck has moved rearwardly sufficiently to bring the nut 115 into engagement with the adjacent end of the sleeve 102, the latter is moved longitudinally in the opposite direction to its previous movement, that is, to the left of the position shown in Fig. 10, thus causing the groove 107 to move from beneath the pin 109, forcing the latter outwardly so that it rides upon the outer surface of the sleeve 102 and consequently actuates the button 111 of switch LS2. This opens the contacts LS2a, thus terminating rotation of the motor 75 in the reverse direction, it being noted that during this movement of the sleeve 102, the pin 110 remains within the groove 108 so that the switch LS3 is not actuated. The position of the nut 115 may be adjusted upon the rod 114 to provide the desired distance of movement of the stock feeding head or chuck before the movement is terminated, thus determining the length of stock which is fed during such movement.

In the event a conventional stock stop is employed to stop the feeding movement of the stock, the motor is not reversed after each feeding movement but instead the head is simply sequentially moved step-by-step in the feeding direction. In order to facilitate this type of operation, a manually operable switch 119 is provided to prevent energization of the circuit effecting reverse rotation of the motor. As shown in Fig. 9, this switch 119 is preferably of the turn-knob type and is mounted upon the forward face of the housing 98. When the knob of switch 119 is turned into alignment with the indicium marked "off" the motor 75 can be energized only for rotation in the direction which moves the stock feeding head forwardly in a feeding direction. When, however, the knob of switch 119 is positioned in alignment with the indicium marked "on," a circuit is established for effecting both forward and rearward movements of the stock feeding head under control of the chuck actuating lever 33.

In addition to the above switches, the mechanism is further provided with an independent control for reversing the motor which includes a push button switch 120 preferably mounted upon the housing 98 and adapted, when held depressed, to operate the motor 75 in a direction for returning the stock feeding mechanism to the rear.

The mechanism further comprises a limit switch LS1, see Fig. 4, which terminates the rearward movement of the stock feeding head when the latter has reached its extreme rearward position. Therefore, this switch LS1, which has its contacts normally closed, is preferably mounted upon the upper portion of the standard 52 and has its contact operating button 121 in engagement with an actuating rod 122 slidably positioned with in a bore of the standard 52 or a portion of the housing 62 mounted thereon, the actuating rod 122 being normally held in a forward position, as shown in Fig. 4, by a coil spring 123. The outer end of the actuating rod 122 is adapted to be engaged by an adjustable abutment 124 which is preferably formed as the head of a square-headed set screw, threadably received in a rear face of the support 49 of the stock feeding head, and held in adjusted position by a lock or jam nut 125. It will be apparent that when the bar head or chuck has moved rearwardly and nears its extreme position, the head of the screw 124 will engage the rod 122, moving the latter sufficiently to actuate button 121 of the switch LS1, thereby opening the contacts of the latter which are connected in a circuit for the motor 75 so that the motor is deenergized, thereby terminating the rearward movement of the stock feeding head.

The connections of the several switches just mentioned for effecting control of the motor 75, and hence of the stock feeding mechanism, are schematically illustrated in simplified form in Fig. 11. As shown therein, three-phase electrical power of the alternating type is supplied to the apparatus through the power lines L1, L2, and L3. These lines are selectively connectable with the leads 126, 127, and 128, respectively, for the motor 75 through operation of the normally open contacts F1, F2, F3 of a relay F. The motor leads 126, 127, 128 are likewise selectively connectable with the power lines L3, L2, and L1, respectively, through operation of the normally open contacts R1, R2, and R3 of a relay R. Consequently, it will be seen that the relays F and R provide a control for energizing the motor to operate in either the forward or reverse direction, respectively.

The relay F is adapted to be energized through a circuit comprising a wire 129 connecting the power line L1 with one of the contacts LS3a of the limit switch LS3. The other contact of the switch LS3 is connected by a wire 130 to one of the contacts LS5a of limit switch LS5, the second contact of this latter switch being connected by a wire 131 to one side of the relay F. This circuit is completed through a wire 132 which connects the other side of the relay F to the power supply line L2. The relay R is connected between the wires 129, 132 in series with the contacts LS1a of switch LS1, the contacts LS2a of limit switch LS2, the contacts LS4a of limit switch LS4 and the movable contact 119a of the switch 119. The push button switch 120 is bridged about the contacts LS4a and 119a so that the latter are by-passed when the movable contact 120a of the push button switch 120 is operated to circuit closing position.

The operation of the control circuit is believed to be apparent from the above description and will become further evident from the following description of the mode of operation of the apparatus as a whole.

Let it be assumed that no stock is present in the apparatus and that the slidable rod 114 is positioned substantially as shown in Fig. 10 so that the actuating pins 109, 110 are disposed within the grooves 107, 108 respectively. Consequently, the contacts LS2a and LS3a are closed. A length of stock 22 is then inserted through the tubular guide 54 and the stock feeding head or chuck 48 and the inner end is disposed within the liner tube 34 within the spindle 16, the liner tube being at its inner position as shown in Fig. 2. The switch 119 is then turned to its "off" position, thus opening the contact 119a. The collect chuck actuating lever 33 is next moved to the position for effecting opening of the jaws of the chuck. This rocks the lever 31 in a clockwise direction, as viewed in Fig. 1, moving the finger cone 29 from engagement with the fingers 23 so that the jaws of the collet are opened. This movement of the lever 31 also moves the links 94, 96 to the left, as viewed in Figs. 1 and 9, so that the actuating pin 100 is disposed within the cam groove 99 while the pin 101 is displaced from the groove and rests upon the surface of the link or rod 94 adjacent thereto. Consequently, the contacts LS4a are open and the contacts LS5a are closed. Therefore, a circuit is completed from L1 through the wire 129, contacts LS3a, LS5a, relay F and wire 132 to the power lead L2 so that the relay F is energized. The relay R cannot, however, be energized since the contacts LS4a and 119a are open.

Energization of the relay F closes its contacts F1, F2, F3, thereby energizing the motor 75 for rotation in a forward or stock feeding direction. The control lever 33 is further moved in the same direction and this additional movement is transmitted through the links 96, 94 and rod 92 to the actuating rod 90, thus rocking the lever 84, thereby causing the latter to effect engagement of the friction members of clutch 90. The pressure exerted upon the friction clutch is determined by the extent of movement of the control lever 33. The motor 75 therefore drives the screw 60 through the friction clutch 80, sleeve 71, and gears 69, 67, and 66 so that the screw 60 is rotated in the direction which causes the stock feeding head or chuck 48 to move forward or to the right, as viewed in Fig. 1, it being understood that the one-direction ball or roller clutch 77, 78 rotates idly in this direction of movement. The stock 22 is, therefore, moved forwardly through the liner tube 34 and through the jaws of a chuck 19, the rate of movement being determined by the pressure exerted by the operator upon the lever 33, since this determines the amount of friction between the friction members of the clutch 80. The clutch engaging pressure may be relatively light so that sufficient slipping of the clutch occurs to provide for an "inching" or slow movement of the stock, or the clutch may be engaged with sufficient pressure so that practically no slipping occurs thus producing relatively rapid movement of the stock.

The stock is thus fed until its forward end engages a conventional stock stop, not shown, which may be provided upon a turret or other suitable portion of the machine tool, at which time the operator then rocks the control lever 33 in the opposite direction. The initial portion of this movement of lever 33 relieves the pressure upon the rod 90 so that the spring 97 acts upon the plunger 91 to move lever 84 in the direction which allows the friction clutch 80 to disengage, thus stopping further forward movement of the stock feeding head or chuck. The further movement of the control lever 33 in the direction just mentioned shifts the link 94 sufficiently to the right, as viewed in Fig. 9, to allow the pin 101 to enter the cam groove 99 and to move the groove from beneath the pin 100. Consequently, contacts LS5a return to open position, deenergizing relay F, which in turn opens the contacts F1, F2, F3, deenergizing the motor 75. While this movement has actuated the pin 100 to close the contacts LS4a, relay R is not energized since the contact 119a of switch 119 is in open position due to the initial setting of the switch 119. Still further movement of the control lever 33 in the direction last-mentioned effects shifting of the finger actuating cone 29 to the left, as viewed in Figs. 1 and 2, thus actuating the jaws of the collet chuck 19 into gripping engagement with the stock and machining operations may be then performed upon the portion of the stock in advance of the chuck.

When the machined portion of the stock has been severed from the remainder of the stock, the control lever 33 is again rocked in the first-mentioned direction, that is, in the direction which opens the jaws of the chuck 19. This operates as before to energize the motor 75 for rotation in a forward direction and also engages the friction clutch 80 so that the stock is again moved a step forwardly to bring the forward end thereof into engagtment with the fixed stock stop, at which time the operator terminates the feeding of the bar stock and effects gripping of the work by actuating the lever 33.

When the stock feeding head 48 has moved to a position adjacent the standard 51 and after the stock is gripped by the chuck 19, the stock feeding head or chuck may be returned to a position adjacent the standard 52 by the operator depressing the push button 120. This closes a circuit from the power supply line L1 through the wire 129, the closed contacts LS1a, LS2a, contact 120a, relay R and the wire 132 to the power supply line L2. Consequently, relay R is energized closing its contacts R1, R2, R3 thereby energizing the motor 75 for rotation in the reverse direction. Since the control lever 33 is positioned to effect work gripping by the collet chuck 19, the friction clutch 80 is not engaged, and since the motor 75 is now rotating in the reverse direction, the one-direction clutch 77, 78 operates to provide a positive drive from the shaft 72 through the sleeve 71, gears 69, 67, and 66 to rotate the screw 60 in the reverse direction, thus causing the head or chuck 48 to move rearwardly or to the left, as viewed in Fig. 1. During this rearward movement of the stock feeding head or chuck the spring-pressed jaws thereof slide idly along the stock. This movement may be terminated at any time by the operator releasing the push button 120, or if he holds the stop button depressed for a sufficient period of time, the stock feeding chuck will move rearwardly until the screw 124 engages the rod 122 and actuates the limit switch LS1. This opens the contacts LS1a, deenergizing the relay R and terminating the rotation of the motor in the reverse direction. Feeding of the stock may again be initiated by moving the control lever 33 in the opposite direction as previously mentioned.

It will be apparent, therefore, that the operation of the stock feeding mechanism is simply controlled by actuation of the single lever which also effects operation of the work gripping chuck 19. It is not, however, necessary that the operator manually terminate the feeding movement of the mechanism, as just described, but this may be automatically effected so that predetermined lengths of stock are automatically fed on each actuation of the control lever. This is accomplished by disposing the stock head or chuck 48 so that the tapered end of the rod 114 is disposed within the aligned opening of the downward extending portion 58, the latch 118 being then rocked into engagement with the notch 117 of the rod 114, thereby connecting the rod to move with the stock feeding mechanism. The nut 115 is then positioned so that the distance between the inner face of the latter and the collar 116, less the length of the sleeve 102, is equal to the predetermined length of stock which it is desired to feed.

Let it now be assumed that the apparatus has thus been conditioned, that the forward end of the stock 22 is in engagement with the fixed stop, that the collar 116 is engaging the end of the sleeve 102, as shown in Fig. 9, without displacing the latter, and that the switch 119 has been moved into alignment with the indicium marked "on," thereby moving its contact 119a to closed position. The circuit will then be substantially as shown in Fig. 11. Consequently, when the operator now moves the control lever 33 to effect closing of the jaws of collet chuck 19, the link 94 will be shifted as before mentioned to close the contacts LS4a of switch LS4 and open the contacts LS5a of switch LS5. Closing of contact LS4a now effects energization of the relay R, since the contact 119a was closed by the initial position of the switch 119. Therefore, the motor 75 is energized for rotation in the reverse direction so that the screw 60 is rotated through operation of the ball or roller clutch to move the stock feeding mechanism to the rear or the left, as viewed in Fig. 1, it being remembered that the friction clutch 80 is not engaged at this time due to the position of the lever 31 and the connecting links 96, 94 and 92 connected therewith.

Since the jaws of the collet chuck 19 are gripping the stock, this rearward movement of the stock feeding head causes the latter to strip backwardly over the stock carrying with it the rod 114. When this rearward movement has brought the nut 115 into engagement with the end of the sleeve 102, the latter is shifted sufficiently to cause the pin 109 to be forced out of the cam groove 107, thus moving the contacts LS2a of switch LS2 to open position. This deenergizes the relay R and hence the motor 75 terminating the rearward movement of the stock feeding mechanism.

After the machining operation is completed and the machined portion of the stock has been severed, the operator then moves the control lever 33 in the direction to open the jaws of the collet chuck 19 and this acts through the lever 31 shifting the link 94 to the left, as viewed in Figs. 1 and 9, so that the pin 100 enters the groove 99 and the pin 101 is forced outwardly therefrom. Therefore, the contacts LS4a are open while the contacts LS5a are closed. Closing of the contacts LS5a energizes the relay F and hence the motor 75 for rotation of the latter in the forward direction and the movement of the control lever has also rocked the lever 84 to engage the clutch 80 so that the screw 60 is rotated for forward movement of the stock feeding head or chuck 48. The speed of this movement is controlled by the pressure exerted upon the clutch 80 which is dependent upon the pressure exerted on the control lever 33.

As the stock feeding head or chuck 48 now moves forwardly, it advances the stock 22 through the collet chuck 19 and the rod 114 likewise moves forwardly, this movement continuing until the collar 116 on the rod 114 engages the adjacent end of the sleeve 102. This engagement displaces the sleeve 102 sufficiently to cause the pin 110 to be moved out of the groove 108, the pin 109, now, however, rides into the groove 107. Therefore, the contacts LS3a of switch LS3 are open, while the contacts LS2a of the switch LS2 are closed. Opening of the contacts LS3a deenergizes relay F terminating the rotation of the motor 75 and hence stopping the advance of the stock feeding mechanism. Consequently, a predetermined length of stock has been fed and the feeding has been automatically terminated at the proper moment. Additional predetermined lengths of stock are fed in similar manner by simply actuating the control lever 33 and the length of the stock thus fed may be adjusted to any desired length by the proper position of the nut 115.

When the length of stock 22 has been fed a distance such that its rear end can no longer be gripped by the stock feeding head or chuck 48, the latter may be returned to its extreme retracted position by relasing the latch 118 and operating the push button 120, as mentioned before, the head being stopped in its rearmost position by operation of the limit switch LS1. A new length of stock 22' is then inserted within the tube 54 and the stock feeding mechanism, so that the forward end of this new length of stock projects forwardly of the stock feeding head or chuck 48. The liner tube 34 is then grasped by means of its flange 36 and partially withdrawn from within the spindle 16 to a position as indicated in broken lines in Fig. 2, which is determined by the entrance of the plunger 46 within the opening 44 of the liner tube, the plunger thus serving to determine the proper position of the liner tube and retaining the latter in this position against accidental displacement. When thus positioned, the liner tube 34 telescopes over the adjacent ends of the new length of stock 22' and the length 22 which is within the spindle and collet chuck of the machine tool so that the two lengths of stock are supported in alignment and lateral movements thereof are prevented.

The stock feeding mechanism is then actuated as before to effect feeding of stock, this being effected by the new length of stock 22' acting as a pusher bar for the length of stock 22 in advance thereof. It will be understood that during the initial portion of this feeding, it will be necessary for the operator to manually terminate the feeding operation when a predetermined length of stock has been fed until the time when the new stock 22' can be gripped by the collet chuck and the stock feeding head or chuck 48 can be engaged with the adjacent end of the slidable rod 114, but after the new length of stock is gripped in the collet and the head is thus positioned, automatic termination of the feeding movements may be effected as before described.

As the new length of stock 22' thus forces the stock 22 forwardly, the liner tube 34 is held for movement therewith by the plunger 46. However, when the feeding has progressed to a point such that the stock feeding head or chuck 48 engages the flange 36 of the liner tube 34, the latter is thereafter moved inwardly within the spindle by the stock feeding head or chuck 48 until it reaches its innermost position, shown in full lines in Fig. 2. Consequently, the adjacent ends of the stock 22 and 22' are guided within the liner tube until substantially the entire useful length of the stock 22 has been machined. It will be apparent that the internal diameter of the liner tube 34 should be only slightly greater than the stock, such as 22. Consequently, if stock of relatively small diameter is to be employed a liner tube 34 having correspondingly smaller internal diameter may be placed within the spindle 16 or the same liner tube may be used for all sizes of stock and additional liner or filler tubes, such as 38, may be fitted therein to compensate for the different diameter stock, this being shown in Fig. 5.

While the invention has been described with reference to control of the stock feeding mechanism through the actuation of a single control lever 33 which also operates the work gripping chuck on the spindle, it will be apparent that many of the advantages of the invention may be secured without the control of the stock feeding mechanism by means of the chuck actuating lever 33. Thus, if desired, a separate stock feeding control lever may be provided for operating the links, such as 94 and 92, in which event the operator would then actuate the stock feeding mechanism lever with one hand and the chuck actuating lever 33 with the other. Moreover, the switches LS4 andl LS5 need not be operated by the same linkage which actuates the friction clutch 80. These modifications and adaptations of the apparatus, as well as many others, will be readily apparent to those skilled in the art after having had the advantage of this disclosure. Consequently, the invention is not to be considered as limited to the exact details of construction herein shown and described.

Having thus described the invention, I claim:

1. In a stock feeding device for a machine tool, a stock feeding head adapted to engage a length of stock and to feed the latter when said head is moved in one direction, electrically operated power means, an operative connection including a variable torque transmission device between said power means and head for moving said head, an electrical circuit including switch means for controlling the energization of said power means, and manually operable means for actuating said switch means and controlling the torque transmitted by said device, whereby an operator may effect feeding of said stock at a selected rate by sequential actuation of said manual means.

2. The combination as defined in claim 1 and further comprising manually operable switch means in said circuit operable for controlling operation of said power means to effect movement of said head in a reverse direction.

3. The combination as defined in claim 2 and further comprising switch means in said circuit actuated by movement of said head to a predetermined position in said reverse direction for terminating the operation of said power means.

4. In a stock feeding device for a machine tool, a stock feeding head adapted to engage a length of stock and to feed the latter when said head is moved in one direction, the said head being adapted to slip over the stock when the head is moved in the opposite direction and the stock is held by a stock gripping means, electrically operated power means for moving said head in either direction, an electrical circuit controlling the operation of said power means, manually actuated switch means in said circuit operative to initiate operation of said power means for movement of said head in the direction which feeds the stock, switch means in said circuit automatically operated by movement of said head a predetermined distance corresponding to feeding of a predetermined length of stock for terminating operation of the power means, and manually actuated switch means in said circuit for initiating operation of the power means in a reverse direction to move the feeding head in the direction opposite to that which effects feeding of the stock.

5. The combination as defined in claim 4 and further comprising means in said circuit actuated by movement of said head to a predetermined position for terminating the operation of said power means in the said reverse direction.

6. In a stock feeding device for a machine tool, a stock feeding head adapted to engage a length of stock and feed the latter when said head is moved in one direction, the said head being adapted to slip over the stock when the head is moved in the opposite direction and the stock is held by a work gripping means, electrically operated power means for selectively moving said head in either direction, an electrical circuit controlling the operation of said power means, manually operated switch means in said circuit selectively operable to energize said power means for movement of said head in a desired direction, and switch means in said circuit automatically operated by movement of said feeding head to either limit of a predetermined distance of movement thereof for terminating the operation of said power means, whereby a stock feeding operation is manually initiated and automatically terminated with each complete reciprocation of said feeding head feeding the stock a predetermined distance.

7. The combination as defined in claim 6 and further comprising means to adjust the predetermined distance of movement of said feeding head.

8. In a stock feeding device for a machine tool, a stock feeding head adapted to engage a length of stock and to feed the latter when said head is moved in one direction, the said head being adapted to slip over the stock when the head is moved in the opposite direction and the stock is held by a stock gripping means, a reversible electrical motor, means operatively connecting said motor to said head to move the latter when the motor is energized, an electrical circuit controlling the energization of said motor, switch means in said circuit operative to effect energization of said motor for rotation in the direction when produces movement of said head in a stock feeding direction, switch means in said circuit operative to effect energization of said motor in the reverse direction, a single manually positionable means operative to selectively actuate said switch means, and other switch means in said circuit automatically operated by said head when the latter has moved a predetermined distance in either direction to automatically deenergize said motor, whereby successive predetermined lengths of stock are fed by sequential operation of said manually positionable means.

9. The combination as defined in claim 8 and further comprising a movable member for actuating the last-mentioned switch means and means for detachably connecting said movable member to said head for movement therewith.

10. The combination as defined in claim 8 and comprising a member adapted to be connected with said head for actuating the last-mentioned switch means, and adjustable means on the last-mentioned member settable to determine the extent of movement of said member and head necessary to actuate the last-mentioned switch means whereby the length of stock fed by sequential operation of said manually positionable means may be preselected.

11. In a stock feeding and gripping device, stock gripping means, stock feeding means, a control member for effecting operation of the first-mentioned means to and from stock gripping position, electrically operated power means for moving the feeding means, an electrical circuit for controlling the operation of said power means, means in said circuit actuated by movement of said control member in a direction for effecting release of the stock gripping means to initiate operation of said power means in a direction for feeding stock through the gripping means, and means in said circuit actuated by movement of said control member in a direction for effecting stock gripping by the gripping means to initiate operation of said power means in the opposite direction.

12. The combination as defined in claim 11 and further comprising means in said circuit for automatically terminating the operation of said power means in the stock feeding direction after the said power means has moved the feeding means to a predetermined position.

13. In a stock feeding and gripping device for a machine tool, a stock gripping means, a control member for effecting operation of said means to and from stock gripping position, a stock feeding head adapted to engage a length of stock and feed the latter when said stock gripping device is in released position and said head is moved in one direction, the said head being adapted to slip over the stock when the head is moved in the opposite direction and the stock is gripped by said stock gripping means, electrically operated power means for selectively moving said head in either direction, an electrical circuit for controlling the operation of said power means, switch means in said circuit actuated by movement of said control member in a direction for effecting release of the stock gripping means to initiate operation of said power means in a direction for feeding stock through the gripping means, switch means in said circuit actuated by said feeding head when the latter has moved a predetermined distance for terminating operation of said power means, switch means in said circuit actuated by movement of said control member in the direction for effecting gripping of the stock by said gripping means to initiate operation of said power means in a direction for moving said feeding head away from said gripping means so that the said head strips rearwardly over the stock to a new position thereon, and switch means in said circuit actuated by said head when the latter has moved a predetermined distance in said rearward direction to terminate operation of said power means, whereby each complete reciprocation of said feeding head feeds the stock a predetermined distance.

14. The combination as defined in claim 13 and further comprises means to adjust the predetermined distance of movement of said feeding head.

15. In a stock feeding device for a machine tool, a stock feeding head adapted to engage a length of stock and to feed the latter when said head is moved in one direction, an electric motor, means including a friction clutch adapted to operatively connect said motor to said head to move the latter, an electric control circuit for said motor, switch means in said circuit for controlling the energization of said motor, movable means for operating said switch means, and means actuated by said movable means to exert a clutch-engaging pressure on the said clutch, the said movable means and the clutch-engaging means being so constructed and arranged that the extent of movement of said movable means determines the clutch-engaging pressure whereby the rate of feeding of the stock is governed by the extent of slipping of said clutch as determined by the amount of the clutch-engaging pressure exerted thereon.

16. In a stock feeding device for a machine tool, a stock feeding head adapted to engage a length of stock and to feed the latter when said head is moved in one direction, an electrical motor, means including a friction clutch adapted to operatively connect said motor to said head to move the latter, an electrical control circuit for said motor, switch means in said circuit for initiating operation of said motor, manually movable means for operating said switch means, means actuated by said movable means to exert a clutch-engaging pressure on said clutch, the said movable means and the clutch-engaging means being so constructed and arranged that the extent of movement of said movable means determines the clutch-engaging pressure so that the rate of feeding of the stock is governed by the extent of slipping of said clutch as determined by the amount of clutch-engaging pressure exerted thereon, and switch means in said circuit operated by movement of said head to a predetermined position for automatically terminating operation of said motor.

17. In a stock feeding device for a machine tool, a stock feeding head adapted to engage a length of stock and feed the latter when said head is moved in one direction, the said head being adapted to slip over the stock when the head is moved in the opposite direction and the stock is held by a stock gripping means, a reversible electrical motor, means including a friction clutch for operatively connecting the motor to said head for movement of the latter, manually movable means to exert a clutch-engaging pressure on said clutch with the extent of movement of said member determining the clutch-engaging pressure so that the rate of movement of the head is governed by the extent of slipping of said clutch as determined by the amount of pressure exerted thereon, an electrical control circuit for said motor, switch means in said circuit operated by movement of said manual means to one position to energize said motor for rotation in the direction which moves said head in the stock feeding direction, and switch means in said circuit operated by movement of said manual means to another position to energize said motor for rotation in the reverse direction.

18. The combination as defined in claim 17 and further comprising switch means in said circuit operated by said head after a predetermined extent of movement thereof in either direction to terminate operation of said motor.

19. In a stock feeding and gripping device for a machine tool, a stock gripping means, a control member for effecting operation of said means to and from stock gripping position, a stock feeding head adapted to engage a length of stock and feed the latter when said stock gripping device is in released position and said head is moved in one direction, the said head being adapted to slip over the stock when the head is moved in the opposite direction and the stock is gripped by said stock gripping means, a reversible electrical motor, means including a friction clutch adapted to operatively connect said motor to said head to move the latter, means actuated by movement of said control member to exert a clutch-engaging pressure on said clutch with the extent of movement of said member determining the clutch-engaging pressure so that the rate of feeding of the stock is governed by the extent of slipping of said clutch as determined by the amount of pressure exerted thereon, an electrical control circuit for said motor, switch means in said circuit operated by movement of said control lever to effect stock release by said gripping means for energizing said motor for rotation in the direction which moves said head in the stock feeding direction, switch means in said circuit operated by movement of said control lever to effect gripping of the stock by the said gripping means for energizing said motor for rotation in the reverse direction thereby causing the said head to move away from said gripping means, and switch means in said circuit automatically operated by said head after a predetermined extent of movement thereof in either direction to terminate operation of said motor.

20. The combination as defined in claim 19 and in which the said means for operatively connecting the motor to the feeding head further comprises a one-direction clutch operable to transmit movement to said head only when said motor is operating in said reverse direction, the said means for exerting clutch-engaging pressure on said friction clutch being moved to clutch-disengaging position when said control member is positioned to effect gripping by said gripping means and reverse operation of said motor.

FRED H. BOGART.

REFERENCES CITED

The following references are of record in the file of this patent:

UNITED STATES PATENTS

| Number | Name | Date |
|---|---|---|
| 198,211 | Post | Dec. 18, 1877 |
| 782,241 | Hanson | Feb. 14, 1905 |
| 1,402,748 | Drake et al. | Jan. 10, 1922 |
| 1,815,574 | Miller | July 21, 1931 |
| 1,885,224 | Brinkman et al. | Nov. 1, 1932 |
| 2,043,772 | Rich | June 9, 1936 |
| 2,065,083 | Lovely | Dec. 22, 1936 |
| 2,108,274 | Tautz et al. | Feb. 15, 1938 |
| 2,388,594 | Bogart | Nov. 6, 1945 |

FOREIGN PATENTS

| Number | Country | Date |
|---|---|---|
| 570,611 | Great Britain | July 13, 1945 |